UNITED STATES PATENT OFFICE.

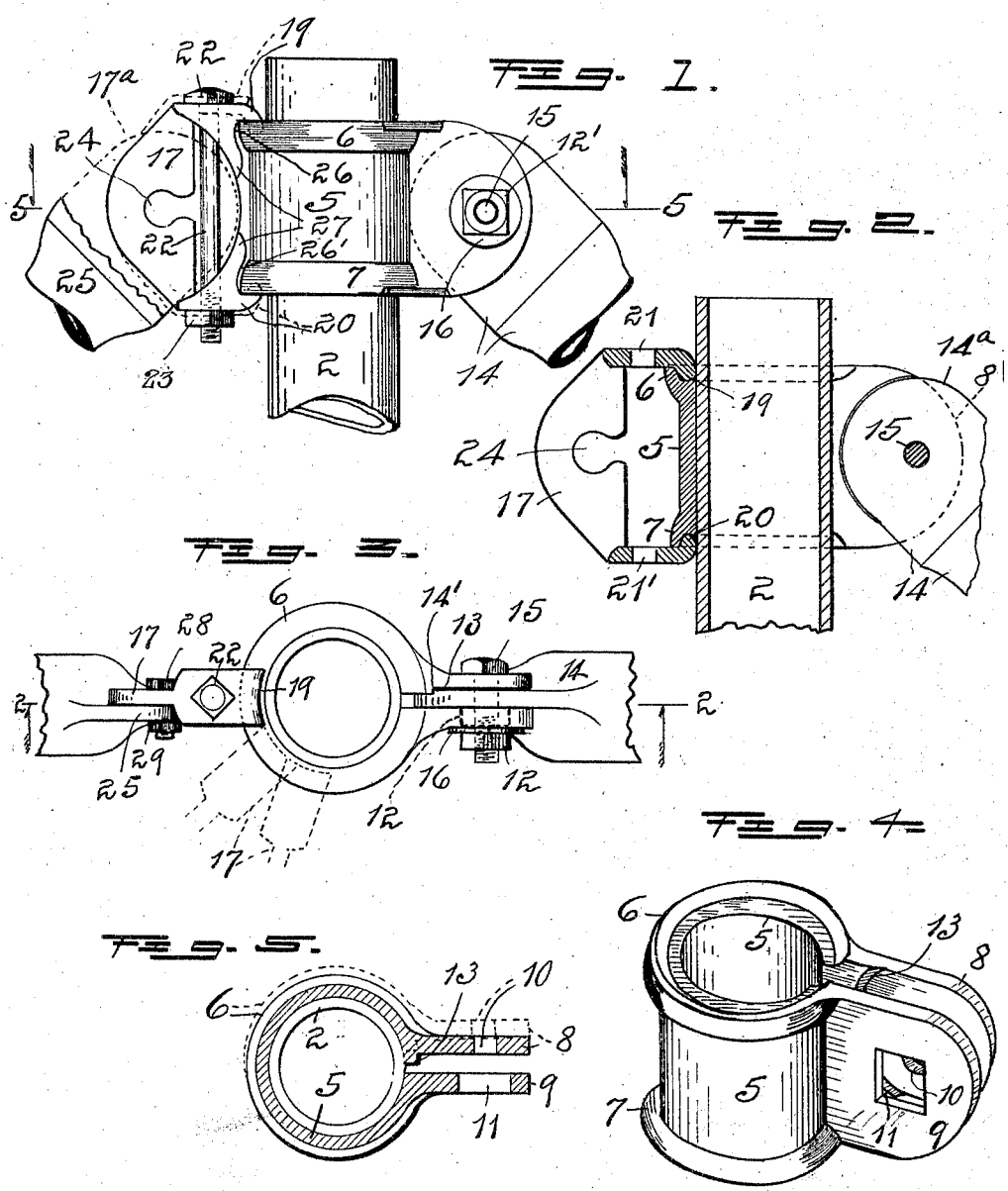

PERRY C. JAMES, OF SCIOTA, ILLINOIS.

FENCEPOST-CLAMP.

1,316,096.   Specification of Letters Patent.   Patented Sept. 16, 1919.

Original application filed December 8, 1917, Serial No. 206,321. Divided and this application filed March 21, 1918. Serial No. 223,792.

*To all whom it may concern:*

Be it known that I, PERRY C. JAMES, a citizen of the United States, and resident of Sciota, in the county of McDonough and State of Illinois, have invented a new and useful Fencepost-Clamp, of which the following is a specification.

This application is a division of original application No. 206,321, filed Dec. 8, 1917.

My invention relates to clamps which are secured to fence-posts, and especially to the corner and terminal posts, in order to brace and hold them erect, and the principal object of the invention is to improve the construction and increase the capacity, utility and efficiency of devices of this character.

The invention consists, substantially, in the improvements hereinafter described.

By way of example, and in order that the nature and operation of the device may be more fully understood, a fence-clamp constructed in accordance with the principles of this invention is illustrated in the accompanying drawings, in which:

Figure 1 is an elevation showing a preferred form of my improvements secured to the upper portion of a fence-post;

Fig. 2, a vertical central section taken in the line 2—2 in Fig. 3;

Fig. 3, a top plan;

Fig. 4, an enlarged perspective of the post-clamping member; and

Fig. 5, a transverse sectional detail taken in the plane of the line 5—5 in Fig. 1.

Considering the drawings in detail and referring to the elements and, where necessary, to the parts thereof, each by a distinguishing reference numeral, 2 indicates a tubular fence-post to which is attached a spring post-clamp comprising a loop 5 having upper and lower hook-flanges 6 and 7 respectively, the end portions of the loop forming ears 8 and 9 having respectively a bolt-hole 10 and an enlarged and preferably angular opening 11 of sufficient size to permit the passage therethrough of a nut 12 which shall presently be again referred to. 13 indicates a shoulder formed in one of the ears and preferably, as shown, in the ear 8.

14 denotes the upper end portion of a rod hinged by a bolt 15 between the ears 8 and 9, its lower end (not shown) being adapted to engage any suitable anchor, also not shown. 14' indicates a shoulder near its inner extremity, adapted to contact the shoulder 13. After the rod 14 has been positioned a bolt 15 is passed through a registering aperture 10, thence through the transverse aperture in said rod, and then engaged with the threads of the nut 12 to draw it to bear against the flattened end of the rod 14. A washer 16 is then to be positioned as shown best in Fig. 3, partly covering the opening 11, and the nut 12' is then threaded up snugly on the bolt 15 to thereby draw the ears 8 and 9 toward each other, thus diminishing the circumference of the loop 5 and causing it to firmly clamp the post.

17 indicates a gripping-iron having oppositely directed hooks 19, 20 and having registering longitudinally formed apertures 21, 21' for the reception of a bolt 22. 23 is a securing nut. The iron 17 is also provided with a transverse aperture 24 which registers with a transverse aperture in the upper end of a link 25 the lower end of which (not shown) is adapted to engage any suitable anchor, not shown. The iron 17 is recessed, as indicated at 26, 26' to form a pocket for the adjacent flange 6 or 7 as the case may be, and is provided with a tongue or projection 27.

After the clamping loop 5 has been secured on the post 2 and the rod 14 engaged with and held by the anchor, the iron 17—which preferably is made of malleable iron and therefore adapted to yield, without breaking, and in which the terminals of the hooks 19 and 20 are preferably normally (or before assemblage) so spaced from each other that they will pass over the flanges 6 and 7, as indicated by the dotted lines in Fig. 1—is positioned as shown by said dotted lines. The nut 23 is then threaded taut upon the bolt 22 to thereby spring or draw the hooks 19 and 20 toward each other to cause them to engage the hook-flanges 6 and 7 and thus secure the iron 17 rigidly to the loop 5. The link 25 may then be secured to the iron 17, by means of the bolt 28 and nut 29 (Fig. 3) in an evident manner and at any desired angle or inclination to a perpendicular. It is to be particularly observed that the hooks 19 and 20 may be engaged with any part of the circumference of the hook-flanges 6 and 7, thus permitting the anchor-link 25 to be arranged at substantially any position relative to the anchor rod 14. Also it is to be noted that the loop 5 may be set at any position circumferentially of the post, and that the rod 14 may be inclined at any angle with reference to the post. Any suitable number of the irons 17, it will be clear, may be employed in connection with a single loop 5.

The fence-wires, or one line of them, will be secured to the post in such manner that they will tend to draw the post toward or in the direction of the anchor member 14. The shoulder 13 will thus be drawn against the shoulder 14′ and the latter will offer ample resistance to prevent the movement of the post in the direction stated.

The grip-iron 17 may if preferred be made in two parts each of which is provided with one of the hooks 19, 20, and the two parts suitably connected, and in some cases it is necessary to use but one of the hooks.

It has not been thought either necessary or best to encumber this specification and the accompanying drawings with descriptions and illustrations of modifications which are neither essential to nor form any part of the invention, considered in its broadest aspect. In fact, I realize that considerable variation is easily possible, with respect to the details of construction, without departing from the spirit of the invention. Therefore I do not intend to limit myself to the specific construction herein shown and described except as pointed out in the following claims, wherein it is my intention to claim as broadly as is permitted by the state of the art all the novelty inherent in the invention.

Having thus described the nature of my invention I claim as new the following, to-wit:

1. In a device of the nature described, a loop adapted to embrace a post and having spaced projecting terminals, said terminals provided with registering orifices and one of them with a shoulder on its inner face, an anchor-member one end of which lies between said projections and has a shoulder adapted to strike the one aforesaid, and a bolt disposed in said orifices whereby to hinge the anchor-member between said ears.

2. In a device of the nature described, a loop adapted to embrace a post and having spaced projecting terminals, said terminals provided with registering orifices and one of them with a shoulder on its inner face, an anchor-member one end of which lies between said projections and has a shoulder adapted to strike the one aforesaid, a nut engaged by the threads of the bolt and disposed in one of said orifices, and means for holding the nut in said orifice.

In witness whereof I hereunto sign my name, at Sciota, McDonough Co., Illinois, this 15 day of March, 1918.

PERRY C. JAMES.

Copies of this patent may be obtained for five cents each, by addressing the "Commissioner of Patents, Washington, D. C."